US011063984B2

(12) United States Patent
Lynk et al.

(10) Patent No.: US 11,063,984 B2
(45) Date of Patent: *Jul. 13, 2021

(54) HIGH PERFORMANCE ACCESS CONTROL

(71) Applicant: INTERNATIONAL BUSINESS MACHINES CORPORATION, Armonk, NY (US)

(72) Inventors: John Christopher Lynk, Kanata (CA); Arn Hyndman, Ontario (CA); Albert Frederick Reiche, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/510,068

(22) Filed: Jul. 12, 2019

(65) Prior Publication Data

US 2020/0186571 A1    Jun. 11, 2020

Related U.S. Application Data

(63) Continuation of application No. 16/210,509, filed on Dec. 5, 2018.

(51) Int. Cl.
*H04L 29/06* (2006.01)
(52) U.S. Cl.
CPC .............. *H04L 63/20* (2013.01); *H04L 63/10* (2013.01)
(58) Field of Classification Search
CPC ........ H04L 63/20; H04L 63/10; H04L 63/102
See application file for complete search history.

(56) References Cited

U.S. PATENT DOCUMENTS 5,649,099 A * 7/1997 Theimer ................. G06F 9/468
709/229
7,594,256 B2    9/2009 Bhat et al.
(Continued)

FOREIGN PATENT DOCUMENTS

CN      101444120 A  *  5/2009  ............. H04L 45/00
KR    20180016731 A  *  2/2018  ............. H04L 67/02
(Continued)

OTHER PUBLICATIONS

Machulak et al., "Architecting Dependable Access Control Systems for Multi-Domain Computing Environments", Newcastle University, 2009, 32 pages.
(Continued)

*Primary Examiner* — John B King
(74) *Attorney, Agent, or Firm* — Scott Dobson; Andrew D. Wright; Roberts Calderon Safran & Cole, P.C.

(57) ABSTRACT

A computer-implemented method includes receiving a request for access to a micro-service for a subject to perform an action using a resource; determining whether an access policy governing the access for the subject to perform the action using the resource is stored in a cache memory; in response to the access policy being stored in the cache memory, allowing or denying the request based on the access policy; in response to the access policy not being stored in the cache memory, requesting a new access policy for the subject to perform the action using the resource; receiving the new access policy including an access decision and a duration of the new access policy; allowing or denying the request based on the new access policy; and storing the new access policy in the cache memory.

20 Claims, 8 Drawing Sheets

(56) References Cited

U.S. PATENT DOCUMENTS

| | | | |
|---|---|---|---|
| 9,401,930 | B2 | 7/2016 | Giambiagi et al. |
| 9,537,893 | B2 | 1/2017 | Brucker et al. |
| 2003/0126464 | A1* | 7/2003 | McDaniel ............... H04L 63/20 726/4 |
| 2005/0021978 | A1* | 1/2005 | Bhat ..................... H04L 63/102 713/182 |
| 2006/0089932 | A1 | 4/2006 | Buehler et al. |
| 2008/0083011 | A1* | 4/2008 | McAlister ............... H04L 63/20 726/1 |
| 2008/0184336 | A1* | 7/2008 | Sarukkai ............ G06F 21/6218 726/1 |
| 2008/0256030 | A1 | 10/2008 | Clark |
| 2014/0130119 | A1* | 5/2014 | Goldschlag ............. H04L 63/20 726/1 |
| 2015/0101014 | A1 | 4/2015 | Giambiagi et al. |
| 2015/0200970 | A1 | 7/2015 | Lim |
| 2016/0094582 | A1* | 3/2016 | Watson ................ H04L 63/168 726/1 |
| 2016/0139573 | A1 | 5/2016 | Soni et al. |
| 2017/0331832 | A1* | 11/2017 | Lander ................ H04L 63/0807 |
| 2019/0052621 | A1* | 2/2019 | Sahraei ............... H04L 63/0807 |

FOREIGN PATENT DOCUMENTS

| | | | | |
|---|---|---|---|---|
| WO | WO-2004063960 | A1 * | 7/2004 | ............. G06F 21/10 |
| WO | WO-2004109443 | A2 * | 12/2004 | ............... H04L 9/08 |
| WO | WO-2014022755 | A2 * | 2/2014 | ............. H04L 63/20 |

OTHER PUBLICATIONS

Hulsebosch et al., "Federated Authorisation and Group Management in e-Science", Surf Net, 2010, 84 pages.
Rissanen, "eXtensible Access Control Markup Language (XACML) Version 3.0", OASIS, Jan. 22, 2013, 142 pages.
Fielding, et al., "Hypertext Transfer Protocol—HTTP/1.1", RFC, 2016, 19 pages.
Mell et al., "The NIST Definition of Cloud Computing", NIST, Special Publication 800-145, Sep. 2011, 7 pages.
List of IBM Patents or Patent Applications Treated as Related, dated Jul. 12, 2019, 1 page.
Specification "High Performance Access Control" and Drawings in U.S. Appl. No. 16/210,509, filed Dec. 5, 2018, 47 pages.
Office Action dated Nov. 4, 2020 in U.S. Appl. No. 16/210,509, 18 pages.
Notice of Allowance dated Mar. 3, 2021 in related U.S. Appl. No. 16/210,509, 10 pages.

* cited by examiner

HIGH PERFORMANCE ACCESS CONTROL

BACKGROUND

Aspects of the present invention relate generally to improved performance access control in a software architecture and, more particularly, to advanced caching at policy enforcement points of the software architecture.

Current best practices in access control management typically dictate having the policy decision logic in a centralized policy decision point (PDP). Modern software architectures typically leverage highly distributed systems based, for example, on micro-services, which results in the policy enforcement points (PEP) actually being distributed as well.

Traditionally, the PDP decision making logic is distributed to run local to the PEP rather than in a centralized location, and previous decisions are typically cached to reduce the number of calls to the remote policy decision point.

SUMMARY

In an aspect of the invention, there is a computer-implemented method comprising: receiving, at a computer device, a request for access to a micro-service for at least one subject to perform at least one action using at least one resource; determining, at the micro-service, whether an access policy governing the access for the at least one subject to perform the at least one action using the at least one resource is stored in a cache memory; in response to the access policy being stored in the cache memory, allowing or denying the request to the micro-service, at the computer device, based on the access policy; in response to the access policy not being stored in the cache memory, requesting a new access policy, from the computer device, for the at least one subject to perform the at least one action using the at least one resource; receiving the new access policy, at the computer device, the new access policy including an access decision and a duration of the new access policy; allowing or denying the request, at the computer device, based on the new access policy; and storing the new access policy in the cache memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
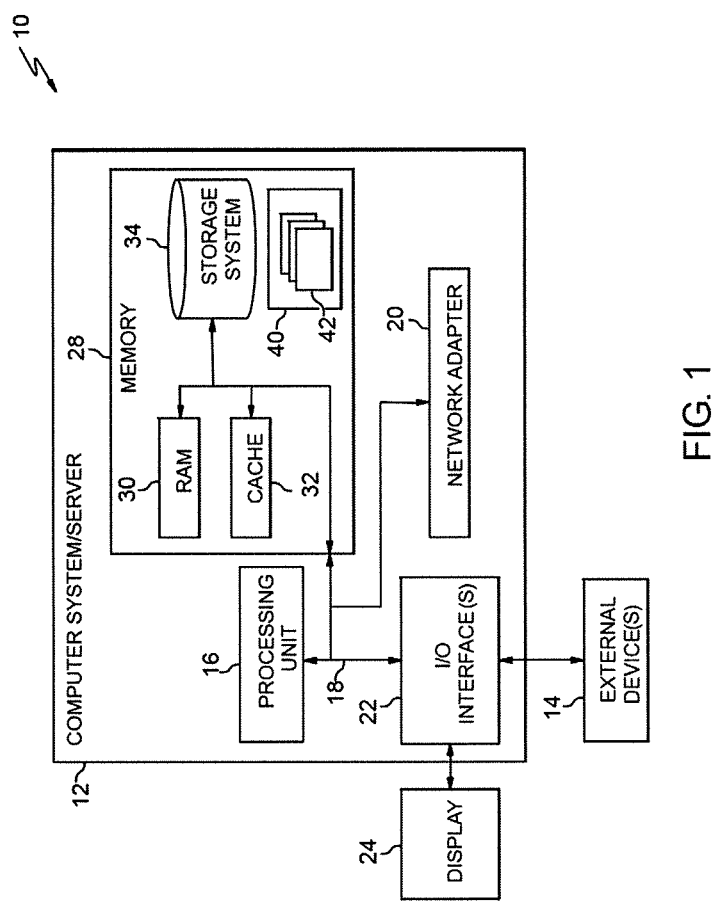
FIG. 1 depicts a cloud computing node according to an embodiment of the present invention.

Aspects of the present invention relate generally to improved performance access control in a software architecture and, more particularly, to advanced caching at policy enforcement points of the software architecture. Current best practices in access control management typically have policy decision logic that is located at a centralized policy decision point (PDP) and a micro-service connected to the PDP via a network, the micro-service having a policy enforcement point (PEP) to determine access to the micro-service. However, modern software architectures typically leverage highly distributed systems such as, for example, systems based on micro-services, which results in the PEPs actually being distributed as well. In the case of a large number of micro-services, this typically results in wanting performance in the application or micro-service where the PEPs reside because of the communications needed between the PEPs and the PDP in order to determine access to the micro-services, which creates network overhead related to the access control checks against the centralized PDP. This issue is typically addressed by either distributing the PDP decision making logic so that the decision making logic is performed locally at the various PEP locations rather than at a centralized location such as the PDP, or caching previous decisions to reduce the number of calls to the PDP.

In the case of distributing the PDP decision making logic, the policy decision logic can be complex and typically requires access to several data sources, which typically result in significant resource requirements that are required at every micro-service where the policy must be enforced. Furthermore, any policy changes are distributed to all the PDPs at each of the micro-service locations. In addition, because distributed systems do not always use homogeneous hardware/OS/programming languages, and the like, the complex logic of the policy decision point is ported across many systems, and this process is typically expensive and time consuming. Distributing the policy logic as discussed above also typically increases the risk of errors in multiple implementations, as well as the attack surface for potential hackers to compromise the system.

In the case of caching previous decisions, this non-expanded caching technique is effective, for example when a same access control query is repeated a number of times. In this case, a cache implemented at the PEP based on at least one subject, at least one action, and at least one resource reduces the number of calls to the centralized PDP, which improves latency and overall performance. In embodiments, the subject includes a user, a computer application or a micro-service. However, when a large amount of resources, actions, or subjects are iterated over, this type of caching has the drawback of adding delays to policy changes and possibly reducing the ability of the system to accurately enforce time-of-day rules. These drawbacks are typically partially addressed by reducing the cache period, which has the cost of reduced cache access rate, or by adding a notification mechanism, which has the cost of increasing complexity.

Aspects of the current invention retain the centralized policy decision point at the PDP, and leverages caching in a more advanced way than discussed above. Specifically, aspects of the invention leverage the fact that access control policy is typically created using broad rules, e.g., a given group of subjects or users can access a given group of resources to perform a given group of actions. In response to the PDP making a decision due to such a rule, the PDP would ordinarily return simply allowed or denied.

In embodiments, the caches of the PEPs that are localized at the various micro-services are augmented by cache expansion information and cache duration policy. The cache expansion information indicates that the PDP has determined that an entire group of subjects, group of actions, or group of resources are all permitted or denied. This allows each PEP cache to be pre-loaded with permit/deny results for the entire group of subjects/resources/actions from a single access control query at the PEP site. Subsequent queries for the same group of subjects/actions/resources that fall into that set can be answered near instantly from the cache at the PEP site without having to generate a call to the centralized PDP. In addition, cache duration policy is also returned from the PDP to the PEPs for each query, and the policy indicates how long the response to access for the group of subjects/actions/resources is cached. This methodology reduces issues related to time-of-day rules, and allows cache duration to be more specifically tuned depending on query frequency, likelihood of changes, and the like. Embodiments provide the benefit that the complexity of the logic which must be distributed at each PEP remains close to non-expanded caching, where each PEP adds entries to the cache as instructed by the cache expansion information and obey the cache duration policy, both the cache expansion information and the cache duration policy being provided by the centralized PDP.

As will be understood from the description herein, an implementation of the invention includes a computer-implemented process for access control comprising: in response to a request for access from a policy enforcement point, using a selected policy defined at a policy determination point to determine whether to permit the request using a policy augmented with cache duration information; in response to a positive decision, returning the positive decision to the policy enforcement point including the cache duration information and cache expansion information including a list of subjects, actions, and resources for which the decision also applies; in response to a negative decision, returning the negative decision to the policy enforcement point computing a deny space and including the cache duration information and cache expansion information; wherein in response to cache expansion information from the policy determination point, the policy enforcement point preloads a cache for related subjects, actions, and resources for a duration specified in the cache duration information.

Embodiments of the invention improve the technology of access control to a micro-service by caching access information relative to groups of subjects, groups of functions or groups of resources. Embodiments of the invention employ an unconventional arrangement of steps including: receiving a request for access to a micro-service for at least one action on at least one resource by at least one subject; determining whether an access policy governing the access for the at least one subject to perform the at least one action using the at least one resource is stored in a cache memory; in response to the access policy being stored in the cache memory, allowing or denying the request to the micro-service based on the access policy; in response to the access policy not being stored in the cache memory, requesting a new access policy for the at least one subject to perform the at least one action using the at least one resource; receiving the new access policy including an access decision and a duration of the new access policy; allowing or denying the request based on the new access policy; and storing the new access policy in the cache memory. The combination of the steps is unconventional. Embodiments of the invention also utilize elements and/or techniques that are necessarily rooted in computer technology, including decreasing network traffic. Embodiments improve the functioning of a computer combination, in this case a server and one or more micro-services, and more specifically includes aspects that are directed to a specific improvement of the operation of the micro-service, and thus are directed to a specific implementation of a solution to a problem in determining access to micro-services in a software architecture.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various micro-services through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
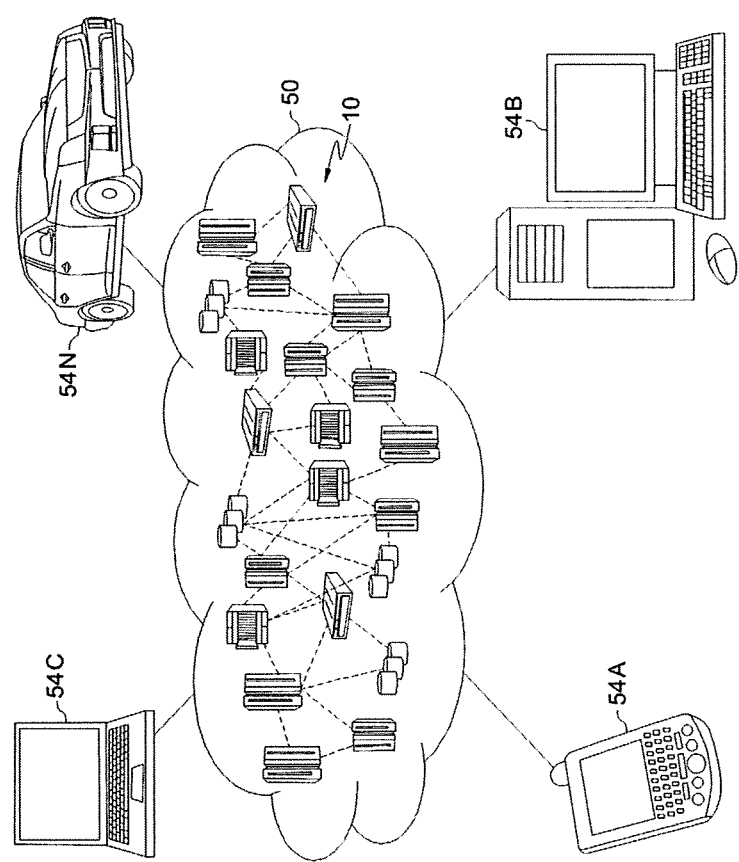
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
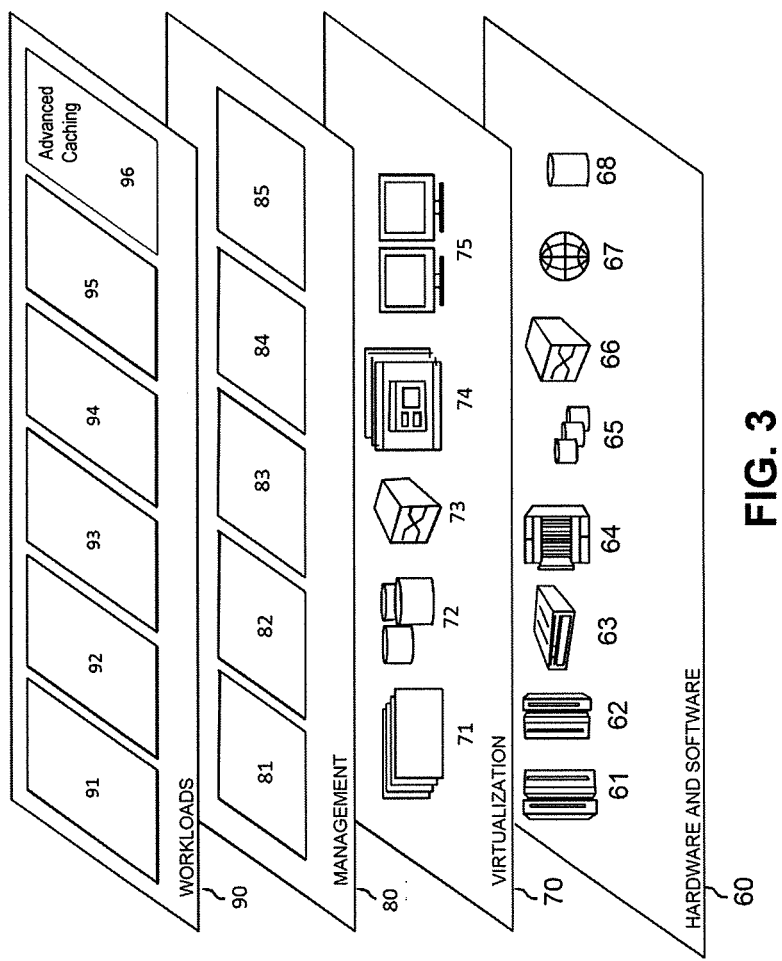
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and advanced caching 96.

Implementations of the invention may include a computer system/server 12 of FIG. 1 in which one or more of the program modules 42 are configured to perform (or cause the computer system/server 12 to perform) one of more functions of the advanced caching 96 of FIG. 3. For example, the one or more of the program modules 42 is configured to: receive a request for access for at least one action on at least one resource by at least one subject; determine whether a cache of the micro-service includes an access policy governing the at least one action on the at least one resource by the at least one subject; in response to the cache of the micro-service including the access policy, allow or deny the request based on the access policy; in response to the cache of the micro-service not including the access policy, request a new access policy for the at least one action on the at least one resource by the at least one subject; receive the new access policy, the new access policy including an access decision and a duration of the new access policy; allow or deny the request based on the new access policy; and store the new access policy at the cache of the micro-service.

Figure 4:
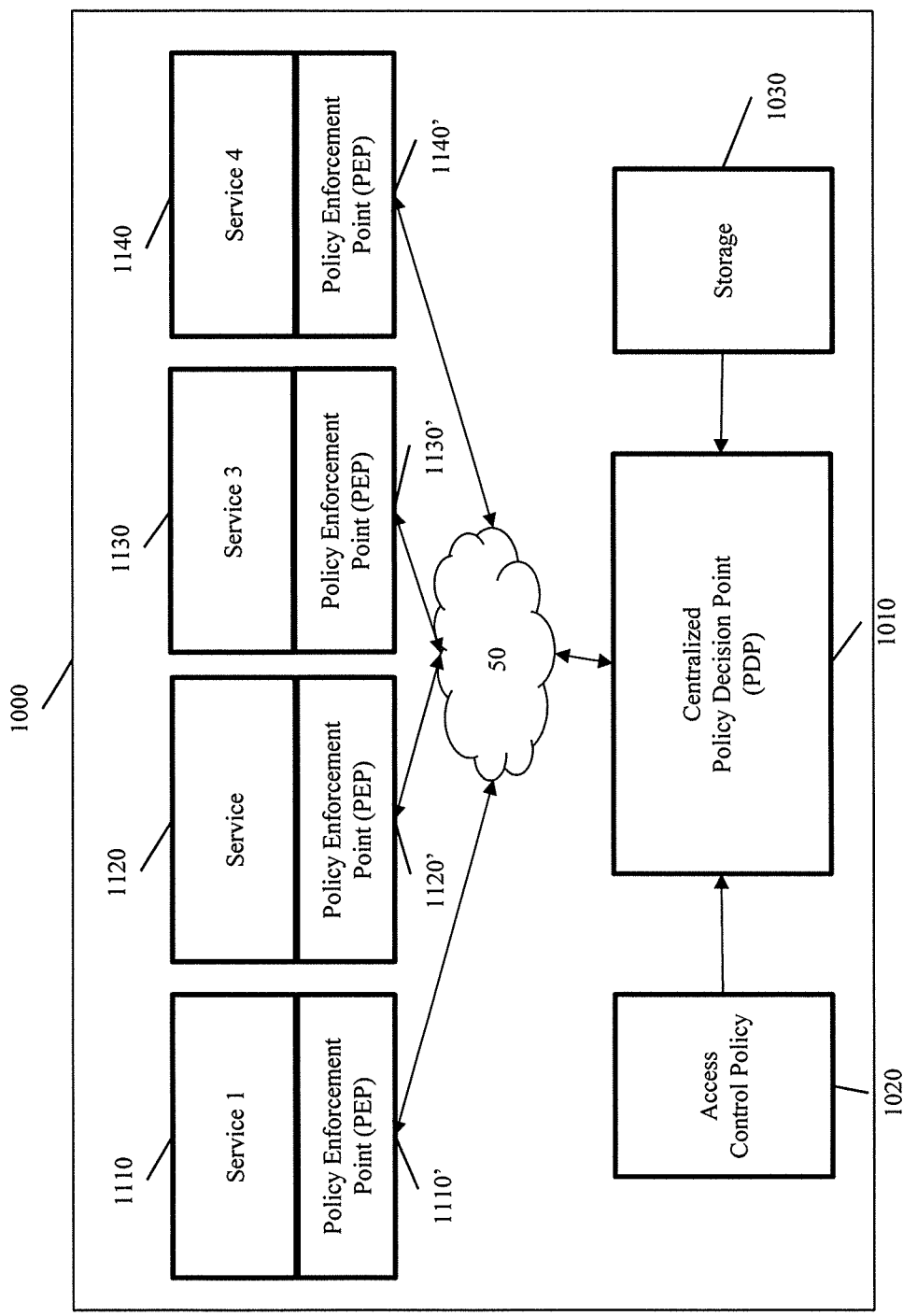
FIG. 4 shows a block diagram of an exemplary environment in accordance with aspects of the invention.

FIG. 4 shows a block diagram of an exemplary environment in accordance with aspects of the invention. In embodiments, the environment 1000 includes a centralized policy decision point (PDP) 1010, which is a program hosted in, and running on, a server including one or more components of the computer system/server 12 illustrated in FIG. 1. In embodiments, the environment 1000 also includes a plurality of micro-services 1110, 1120, 1130 and 1140, each of the micro-services 1110, 1120, 1130 and 1140 being a program housed in, and running on, a computer device including one or more components of the computer system/server 12 illustrated in FIG. 1. Specifically, a micro-services architecture is a methodology that breaks up an application into plural different services, such as the micro-services 1110, 1120, 1130 and 1140, that each perform a specific process of an application. The micro-services are independent from one another such that one of the micro-services can be changed without changing the others and without having to change the entire application. Micro-services typically operate by making calls to one another and receiving responses to those calls. In embodiments, each of the micro-services 1110, 1120, 1130 and 1140 is an application (program module) running on a computer device including one or more components of the computer system/server 12 illustrated in FIG. 1.

In embodiments, the PDP is operatively coupled to an Access Control Policy module 1020, and the Access Control Policy module 1020 includes access control rules regulating the access of one or more subject to perform one or more actions using one or more resources at the micro-services 1110, 1120, 1130 and 1140. In embodiments, the subject, actions and resources are stored in storage module 1030, which includes one or more components of the storage system 34 illustrated in FIG. 1, the storage module 1030 being operatively coupled to the PDP 1010. In embodiments, each of the Access Control Policy module 1020 and the storage module 1030 includes one or more program modules such as program modules 42 described with respect to FIG. 1.

In embodiments, the server hosting the PDP 1010 is operatively coupled to the computer devices hosting the micro-services 1110, 1120, 1130 and 1140 via a network such as, for example, the cloud computing environment 50 illustrated in FIG. 2. In embodiments, each of the computer devices hosting the micro-services 1110, 1120, 1130 and 1140 also host corresponding Policy Enforcement Points (PEP) 1110', 1120', 1130' and 1140', which are programs including access rules regulating access to the corresponding micro-services 1110, 1120, 1130 and 1140. In embodiments, the micro-service 1110 and the PEP 1110' are hosted in the same computer device. In embodiments, the micro-service 1120 and the PEP 1120' are programs hosted in the same computer device. In embodiments, the micro-service 1130 and the PEP 1130' are programs hosted in the same computer device. In embodiments, the micro-service 1140 and the PEP 1140' are programs hosted in the same computer device.

In embodiments, the rules of access included in any one of the PEPs 1110', 1120', 1130' and 1140' include access rules regulating the access, for one or more subjects/group of subjects to perform one or more tasks/group of tasks and using one or more resources/group of resources, to a corresponding one of the micro-services 1110, 1120, 1130 and 1140. In embodiments, the PEPs 1110', 1120', 1130' and 1140' also access a duration information which specifies a period of time within which the access rules are applicable, the duration information being stored in a cache memory of the computer device hosting the respective micro-services 1110, 1120, 1130 and 1140, the cache memory including one or more components of the cache memory 32 illustrated in FIG. 1.

In embodiments, the centralized PDP 1010 includes separate rules governing access to each of the micro-services 1110, 1120, 1130 and 1140, as well as separate durations of time for which the access to each of the micro-services 1110, 1120, 1130 and 1140 is granted or denied. In embodiments, these rules, for example included in the Access Control Policy module 1020, are stored in a cache memory of the computer server hosting the centralized PDP 1010 such as, for example, the storage module 1030. As the computer server hosting the centralized PDP 1010 is in communication with the computer device hosting each of the micro-services 1110, 1120, 1130 and 1140 via the network or cloud computing environment 50, for each of the micro-services 1110, 1120, 1130 and 1140 and respective PEPs 1110', 1120', 1130' and 1140', the PDP 1010 transmits the relevant access rules governing access of subjects/group(s) of subjects to perform tasks/group(s) of tasks using resources/group(s) of resources to each computer device hosting each of the micro-services 1110, 1120, 1130 and 1140, and loads the relevant access rules in a cache memory of each computer device. In embodiments, the PDP 1010 transmits the access rules to the micro-services 1110, 1120, 1130 and 1140 based on relevance of each access rule to each micro-service. The access rules stored in the cache memory of the computer device hosting each of the micro-services 1110, 1120, 1130 and 1140 are accessible by the respective PEPs 1110', 1120', 1130' and 1140'.

In embodiments, the PDP 1010 only transmits and loads access rules that regulate access to micro-service 1110 to a cache memory of the computer device hosting the micro-service 1110, and the PEP 1110' only accesses the access rules stored in a cache memory of the computer device hosting the micro-service 1110. For example, the PDP 1010 does not load access rules that regulate access to micro-service 1120 to a cache memory of the computer device hosting the micro-service 1110, and the PEP 1120' does not have access to the cache memory of the computer device hosting the micro-service 1110. In embodiments, the PDP 1010 also transmits and loads duration information concerning the length of time during which the rules of access to a given micro-service from the micro-services 1110, 1120, 1130 and 1140 are to be enforced, and stores the duration information in a cache memory of the computer device hosting the relevant micro-services 1110, 1120, 1130 and 1140. In embodiments, past the length of time specified in the duration information provided by the PDP 1010 to a given micro-service, the rules governing access to the given micro-service become no longer applicable.

Figure 5:
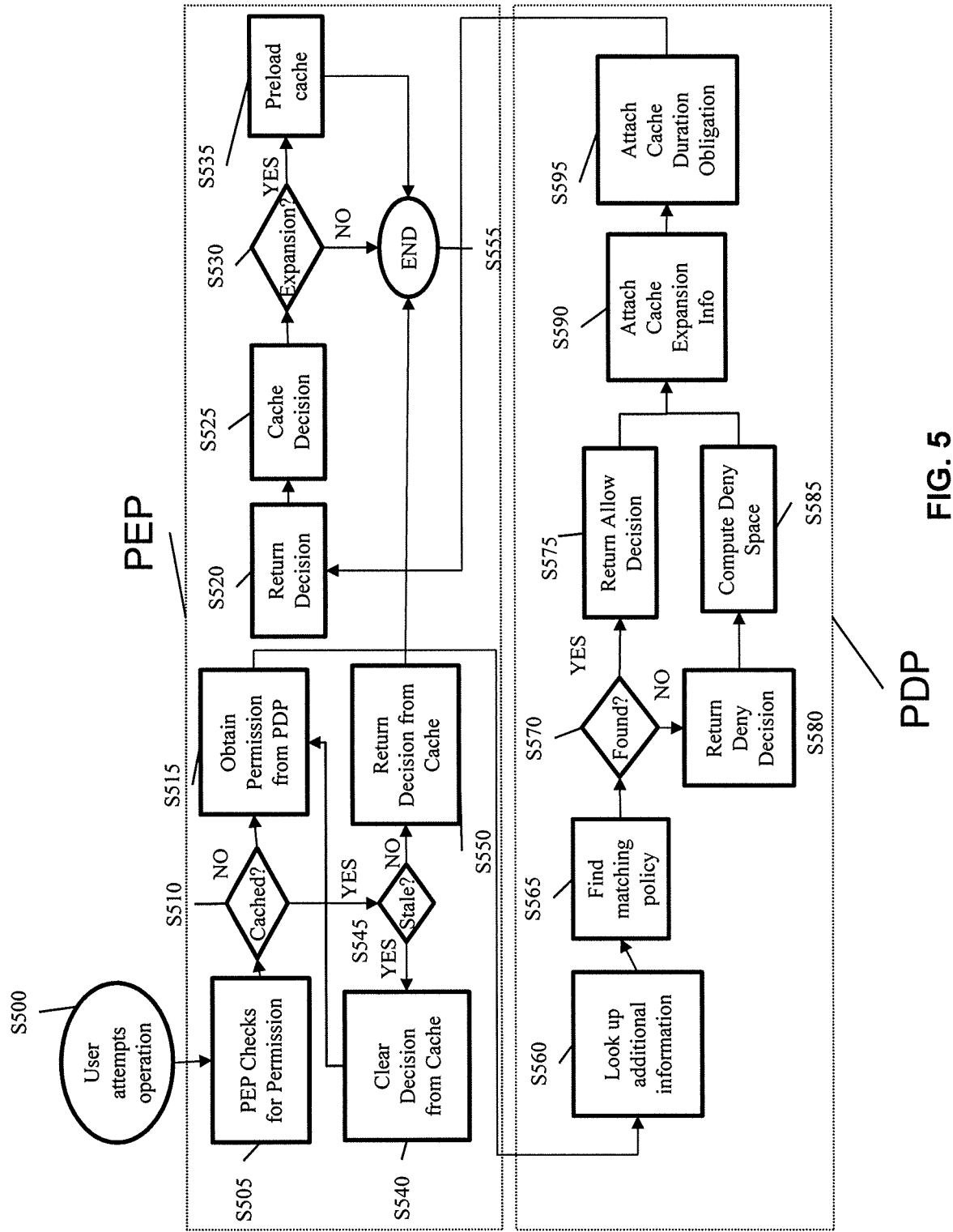
FIG. 5 shows a flowchart of an exemplary method in accordance with aspects of the invention.

FIG. 5 shows a block diagram of an exemplary method in accordance with aspects of the present invention. Steps of the method may be carried out in the environment of FIG. 4 and are described with reference to elements depicted in FIG. 4. In embodiments, at step S500, a subject at a client device attempts operation of a micro-service by requesting access to the micro-service. In embodiments, the micro-service includes any one of the micro-services 1110, 1120, 1130 and 1140 illustrated in FIG. 4. In embodiments, the PEP at the micro-service checks permission at step S505 whether to authorize access of the subject to the micro-service. In embodiments, the PEP includes any one of the PEPs 1110', 1120', 1130' and 1140' illustrated in FIG. 4. At step S510, the PEP determines whether access instructions to the micro-service are cached in a cache memory of the computer device hosting the micro-service. In embodiments, if at step S510, the cache memory of the computer device hosting the micro-service includes access instructions to the micro-service, step S510 returns a "YES" and at step S545 the PEP checks whether the access instructions are past a time duration of access to the micro-service. In embodiments, if the access instructions are not within the duration of access to the micro-service, i.e., if the access instructions are "stale," then at step S540 the PEP deletes the access instructions from the cache memory of the computer device hosting the micro-service at step S540. In embodiments, if the access instructions are within the time duration of access to the micro-service, i.e., if the access instructions are not "stale," then at step S550 the PEP returns an access authorization decision to the subject, and the subject is granted or denied access to the micro-service based on the access authorization decision. In response to the decision being returned at step S550, the method ends at step S555.

In embodiments, if at step S510 the access instructions to the micro-service are not cached in a cache memory of the computer device hosting the micro-service, step S510 returns a "NO" and at step S515 the PEP requests access instructions, such as permission to access the micro-service by the requesting subject, from the centralized PDP such as the PDP 1010 illustrated in FIG. 4. As a result, in embodiments, at step 560, the centralized PDP receives a request for access to the micro-service, and specifically a request for access for the subject to perform an action using a resource, and at step S565, the PDP queries an access control policy stored in a cache memory of the server hosting the PDP, such as at the Access Control Policy module 1020 illustrated in FIG. 4, to determine whether an access authorization policy exists that matches the request. In embodiments, at step S570, if the PDP finds a matching policy, in a cache memory of the server hosting the PDP, with respect to the access authorization request, then at step S575, the PDP returns an "allowed" access instruction. In embodiments, if at step S570 the PDP does not find a matching policy with respect to the access authorization request in a cache memory of the server hosting the PDP, then at step S580, the PDP returns a "denied" access instruction, and at step S585 the PDP caches the "denied" access instruction in the cache memory of the server. In the example above, the default decision is "allowed." However, in embodiments, the default decision is "denied."

In embodiments, whether the PDP returns a "denied" or an "allowed" access instruction, the PDP expands the cache memory with the access instruction at step S590, and attaches a duration information to the expanded cache memory at step S595. In embodiments, expanding the cache memory includes adding other access instructions to the cache memory, and attaching the duration information includes adding the duration information to the cache memory. In embodiments, the duration information specifies the length of time during which the access instructions cached at step S590 are applicable. Subsequently, the PDP returns the expanded cache information along with the duration information to a requesting module such as, for example, the PEP, in order to allow the PEP to return an access decision in response to the subject access request.

In embodiments, at step S520, the PDP returns the access instructions to the PEP. At step S525, the PEP caches the access instructions in a memory of the computer device hosting the micro-service so as to be locally accessible by the PEP. In embodiments, also at step S525, the PEP also caches the duration information regarding the length of time during which the access instructions are valid in a memory of the computer device hosting the micro-service.

In embodiments, the PEP stores the access instructions and the duration information in a cache memory of the computer device at step S525, and at step S530, the PEP determines whether the cached access instructions can be expanded. Specifically, in embodiments, if the access authorization is granted to a given subject at step S520, and the subject is part of a larger group of subject s sharing a unique characteristic, then the PEP expands the access authorization to the entire group at step S530. For example, if the subject is the member of a class in a school and is granted access to a class schedule, then at step S530 the PEP grants access to all the classmates of the subject to the same class schedule. In embodiments, if the PEP grants access to a subject with respect to a given action that is part of a larger group of actions sharing a unique characteristic, then the access authorization is expanded to all the other actions within that group of actions for that same subject. For example, if the PEP grants access to subject "Paul" to edit an invoice for a given customer, then the PEP expands the access authorization at step S530 to allow subject "Paul" to be granted an action group on the invoices (i.e., a larger group), the action group including viewing invoices, editing invoices, downloading invoices, and the like, for that customer. In embodiments, if the PEP grants access to a subject performing an action utilizing a given resource that is part of a larger group of resources sharing a unique characteristic, then the PEP expands the access authorization to all the other resources within that group. For example, if the PEP grants access to a subject to edit an invoice for the sporting goods department of a store, then the PEP expands the access authorization at step S530 to allow the subject to edit all the invoices in the sporting goods department.

In embodiments, if at step S530 the PEP determines that the access authorization is to be expanded to a larger group, then the PEP at step S535 caches the expanded access authorization instructions in the cache memory of the computer device hosting the micro-service, the expanded access authorization instructions including the access authorization to the larger group that includes the subject, the action or the resource to which the PEP granted access at step S520. In embodiments, if at step S530 the PEP determines that the access authorization is not to be expanded, then the PEP at step S555 does not cache any expanded access authorization instructions in the cache memory of the computer device hosting the micro-service, and the method ends.

Figure 6:
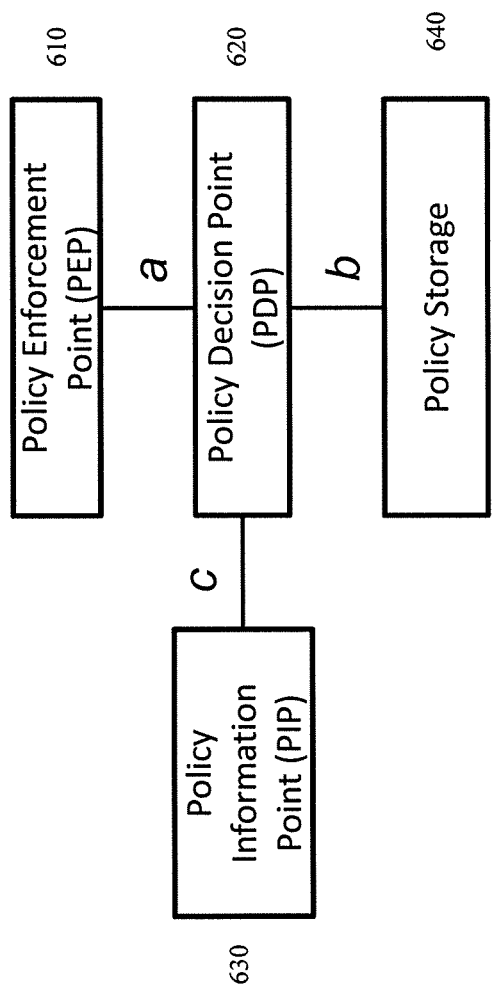
FIG. 6 shows a block diagram of an exemplary method in accordance with aspects of the invention.

FIG. 6 shows a block diagram of an exemplary method in accordance with aspects of the invention. In embodiments, the PDP discussed with reference to FIG. 4 is implemented to read configured access policies from a Policy Storage module 640 and augmenting the configured policies with additional information from any number of Policy Information Points (PIP) 630 to compute access decisions including cache duration and expansion decisions. In embodiments, the PIP includes a tagging service that identifies, or tags, a plurality of subjects, actions or resources as being part of one or more groups because they share a unique characteristic. Such tagging service allows the augmentation of the access policy for one subject/action/resource, which are flexibly grouped according to any one of a number of characteristics or dimensions (e.g., location, type, logical grouping, and the like) to be expanded to one or more of the groups. In embodiments, the tagging service implements the tagging via a hash table to allow for real time lookup of access decision. In operation, in response to a request for access being received from a micro-service, the first call to the PEP 610, which includes any one of the PEPs 1110', 1120', 1130' and 1140' illustrated in FIG. 4, takes an amount of time that is equal to a+b+c, at which point the access policy is stored at a cache memory of the computer device hosting the micro-service, such as one of the micro-services 1110, 1120, 1130 and 1140 illustrated in FIG. 4, and locally accessible by the PEP 610. In embodiments, subsequent calls to the PEP take 0 ms (zero time) because the access authorization policy for a given subject/action/resource is now pre-loaded at the PEP/micro-service site as discussed above with respect to FIGS. 4 and 5. In comparison, when non-expanded caching is used, i.e., when the PEP is not pre-loaded with augmented cache information, then every call to the PEP will require the same amount of time a+b+c. Accordingly, the response time to obtain access authorization, when non-expanded caching is used, is multiplied by the number of access requests, and is thus far greater than the amount of time to obtain access authorization when augmented caching is used according to aspects of the current invention. In embodiments, each of the Policy Storage module 640 and the PIP 630 includes one or more program modules such as program modules 42 described with respect to FIG. 1.

Figure 7A:
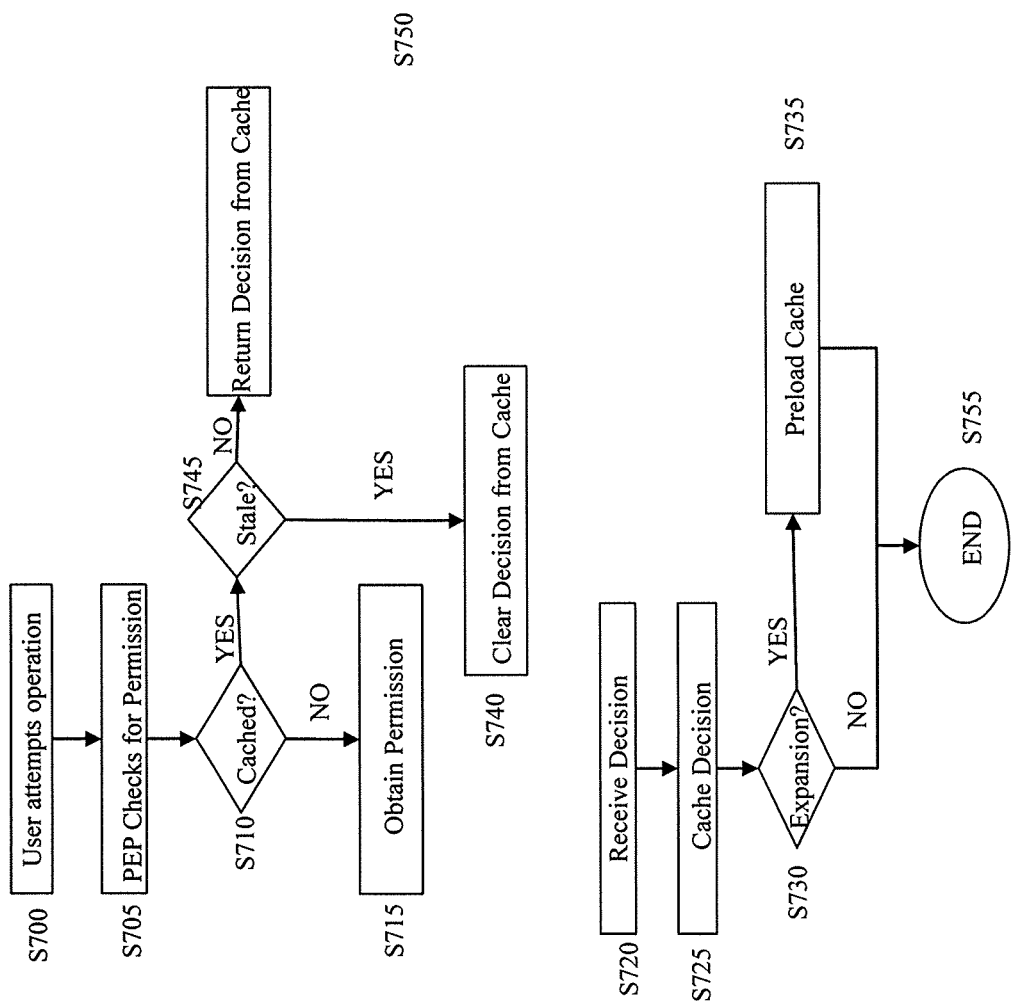
FIGS. 7A-7B show flowcharts of exemplary methods in accordance with aspects of the invention.
Figure 7B:
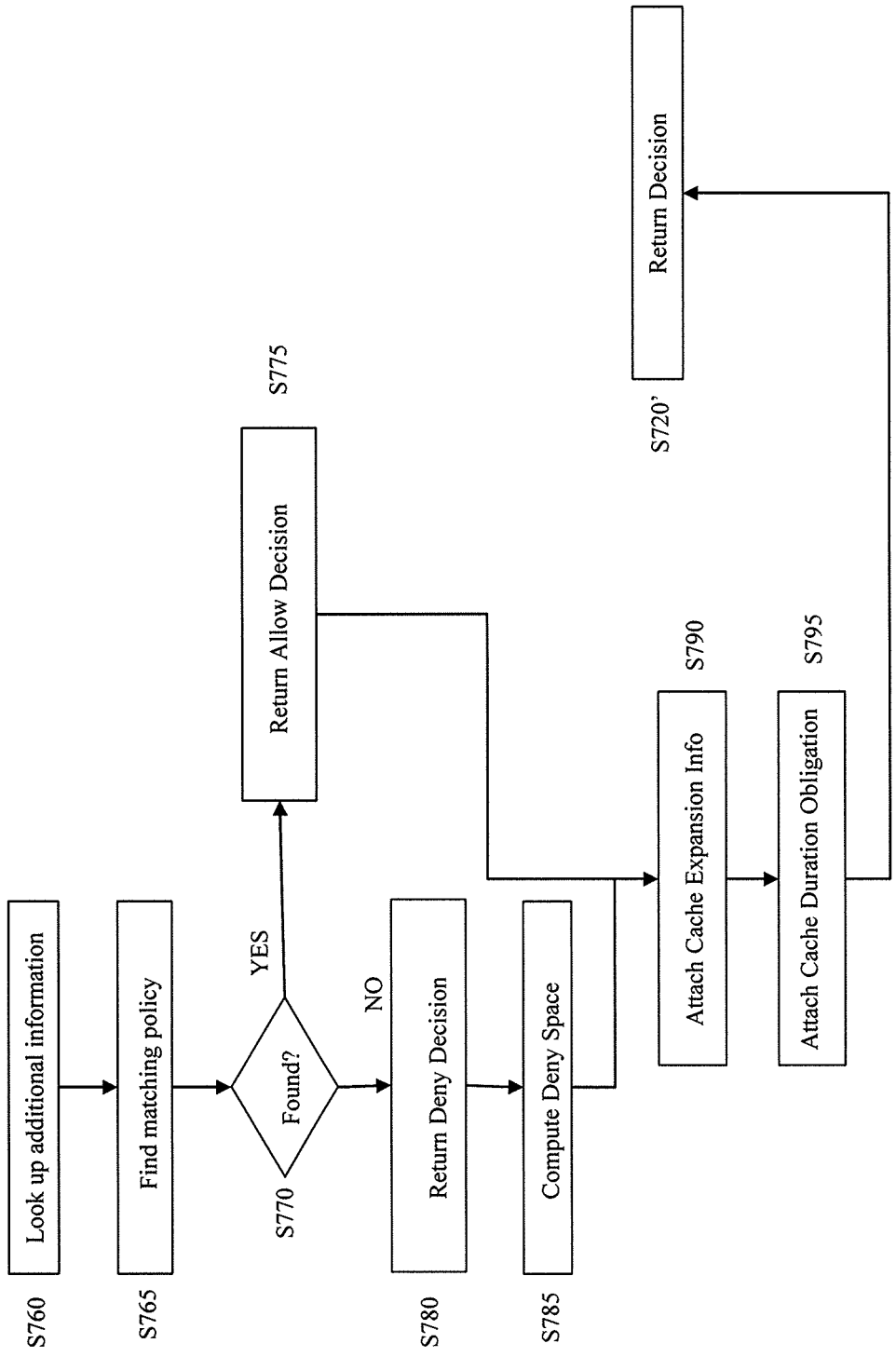

FIGS. 7A-7B show flowcharts of exemplary methods in accordance with aspects of the invention. Steps of the methods are carried out in the environment of FIGS. 4 and 5 and are described with reference to elements depicted in FIGS. 4 and 5.

In embodiments, in FIG. 7A, at step S700 a subject attempts access to a micro-service. In embodiments, the PEP hosted in the same computer device that hosts the micro-service checks permission at step S705 to determine whether the subject is authorized to access the micro-service. At step S710, the PEP checks whether access instructions are cached in a memory of the computer device hosting the micro-service. In embodiments, if at step S710 access instructions to the micro-service are cached in the memory of the computer device hosting the micro-service, then at step S745 the PEP checks whether the access instructions are obsolete, or "stale," in which case at step S740 the PEP deletes the access authorization information from the memory of the computer device hosting the micro-service.

In embodiments, if the access instructions are current, or "not stale," then at step S750 the PEP returns an authorization decision with respect to the subject being granted access to the micro-service. In embodiments, if at step S710 the access instructions to the micro-service are not cached in memory and step S710 returns a "NO," then at step S715 the PEP requests access permission to access the server by the subject from a remote server such as, for example, the server hosting a PDP.

In embodiments, at step S720 in FIG. 7A, the PEP receives access authorization instructions from the PDP, and at step S725, the PEP caches the access authorization instructions in the cache memory of the computer device hosting the micro-service. In embodiments, at step S725, the PEP also caches, in the memory of the computer device hosting the micro-service, a duration information regarding the length of time during which the access authorization instructions are valid. In embodiments, once the PEP caches the access authorization instructions and the duration information in the memory at step S725, the PEP determines at step S730 whether to expand the cached access authorization instructions. In embodiments, expanding the cached instructions includes adding other instructions to the cached instructions and storing the added instructions in the memory of the computer device hosting the micro-service. Specifically, in embodiments, if the PEP grants access authorization to a given subject at step S720, and the subject is part of a larger group of subjects sharing a unique characteristic, then the PEP expands the access authorization at step S730 to all the members of the larger group. In embodiments, if the PEP grants access at step S720 to a subject with respect to a given action that is part of a larger group of actions sharing a unique characteristic, then the PEP expands the access authorization for the subject at step S730 to include all the other actions within that group of actions. In embodiments, if the PEP grants the access authorization at step S720 to a subject performing an action utilizing a given resource that is part of a larger group of resources sharing a unique characteristic, then the PEP expands the access authorization at step S730 to all the other resources within that group of resources.

In embodiments, if at step S730 the PEP determines that the access authorization is to be expanded as discussed above, then the PEP at step S735 caches the expanded access authorization instructions in the cache memory of the computer device hosting the micro-service. In embodiments, if at step S730 the PEP determines that the access authorization is not to be expanded, then the method at step S755 does not cache any expanded access authorization instructions, and the method ends.

FIG. 7B shows a flowchart of an exemplary method in accordance with aspects of the invention. Steps of the method are carried out in the environment of FIGS. 4 and 5 and are described with reference to elements depicted in FIGS. 4 and 5.

In embodiments, at step 760, the PDP receives a request for access to a given micro-service, and at step S765 queries the cache memory of the server hosting the PDP, or queries a policy database external to the PDP and connected to the PDP via a network such as the cloud computing environment 50 illustrated in FIG. 2, to determine whether an access authorization policy exists that matches the request for access to the given micro-service. In embodiments, at step S770, if the PDP finds a matching policy with respect to the access authorization request cached in the cache memory of the server hosting the PDP, then at step S775 the PDP returns a "granted" access instruction. In embodiments, if at step S770 the PDP does not find a matching policy with respect to the access authorization request cached in the cache memory, then at step S780, the PDP returns a "denied" access instruction, and at step S785 caches the "denied" access instruction in the cache memory of the server hosting the PDP.

In embodiments, whether the access instruction that is returned is "denied" or "granted," the PDP expands the cache memory with the access instruction at step S790, and also attaches a duration information, including a period of time during which the access instruction is applicable, to the expanded cache memory at step S795. Subsequently, the PDP returns the expanded cache information along with the duration information to the PEP at step S720', as discussed above with respect to FIG. 7A with corresponding step S720.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, at a computer device, a request for access to a micro-service for at least one subject to perform at least one action using at least one resource;
   determining, at the computer device, whether an access policy governing the access for the at least one subject to perform the at least one action using the at least one resource is stored in a cache memory at a policy enforcement point (PEP) for the micro-service;

in response to the access policy being stored in the cache memory, allowing or denying the request to the micro-service, at the computer device, based on the access policy; and in response to the access policy not being stored in the cache memory, requesting a new access policy, from the computer device, for the at least one subject to perform the at least one action using the at least one resource;

receiving the new access policy, at the computer device, the new access policy including an access decision and a duration of the new access policy;

allowing or denying the request, at the computer device, based on the new access policy; and storing the new access policy in the cache memory as a result of receiving the request.

2. The method of claim 1, further comprising cancelling the new access policy from the cache memory after expiration of the duration of the new access policy.

3. The method of claim 1, wherein:
the at least one subject is part of a group of subjects;
the at least one action is part of a group of actions; and
the at least one resource is part of a group of resources.

4. The method of claim 3, further comprising applying, at the computer device, the new access policy to the group of subjects.

5. The method of claim 1, wherein the computer device is the policy enforcement point (PEP) for the micro-service in a software architecture.

6. The method of claim 1, wherein the new access policy is received from a policy decision point (PDP) of a server, the server being operatively coupled to the computer device.

7. The method of claim 1, wherein the computer device includes software provided as a micro-service in a cloud environment.

8. The method of claim 1, wherein the at least one subject is part of the group of subjects sharing a unique characteristic,
the method further comprising expanding, at the computer device, access authorization to all subjects in a group of subjects.

9. The method of claim 8, further comprising caching, at the computer device, the expanded access authorization in the cache memory.

10. The method of claim 1, wherein the at least one action is part of a group of actions sharing a unique characteristic,
the method further comprising expanding, at the computer device, access authorization to all actions in the group of actions.

11. The method of claim 10, further comprising caching, at the computer device,
the expanded access authorization in the cache memory.

12. The method of claim 1, wherein the at least one resource is part of a group of resources sharing a unique characteristic,
the method further comprising expanding, at the computer device, access authorization to all resources in the group of resources.

13. The method of claim 12, further comprising caching, at the computer device,
the expanded access authorization in the cache memory.

14. The method of claim 12, wherein the at least one subject is part of a group of subjects sharing a unique characteristic, and the at least one action is part of a group of actions sharing a unique characteristic,
the method further comprising:
    expanding, at the computer device, access authorization to all subjects in the group of subjects; and
    expanding, at the computer device, access authorization to all actions in the group of actions.

15. The method of claim 14, further comprising caching, at the computer device, the expanded access authorizations in the cache memory.

16. The method of claim 1, wherein the cache is locally accessible by the PEP for the micro-service.

17. The method of claim 3, further comprising applying, at the computer device, the new access policy to the group of actions.

18. The method of claim 3, further comprising applying, at the computer device, the new access policy to the group of resources.

19. The method of claim 1, wherein the at least one action is part of a group of actions.

20. The method of claim 19, further comprising applying, at the computer device, the new access policy to the group of actions.

* * * * *